No. 619,301. Patented Feb. 14, 1899.
T. HANSEN.
ADVERTISING APPARATUS.
(Application filed Oct. 26, 1898.)
(No Model.) 3 Sheets—Sheet 1.

WITNESSES.
Matthew M. Blunt.
J. Murphy.

INVENTOR.
Thorvald Hansen
by Jas. H. Churchill
ATTY.

No. 619,301. Patented Feb. 14, 1899.
T. HANSEN.
ADVERTISING APPARATUS.
(Application filed Oct. 26, 1898.)
(No Model.) 3 Sheets—Sheet 2.

WITNESSES.
Matthew M. Blunt,
J. Murphy.

INVENTOR
Thorvald Hansen
by Jas. H. Churchill
ATT'Y

No. 619,301. Patented Feb. 14, 1899.
T. HANSEN.
ADVERTISING APPARATUS.
(Application filed Oct. 26, 1898.)

(No Model.) 3 Sheets—Sheet 3.

WITNESSES.
Matthew M. Blunt.
J. Murphy.

INVENTOR.
Thorwald Hansen
by Jas. H. Churchill
ATT'Y.

UNITED STATES PATENT OFFICE.

THORVALD HANSEN, OF EVERETT, MASSACHUSETTS.

ADVERTISING APPARATUS.

SPECIFICATION forming part of Letters Patent No. 619,301, dated February 14, 1899.

Application filed October 26, 1898. Serial No. 694,580. (No model.)

*To all whom it may concern:*

Be it known that I, THORVALD HANSEN, a citizen of the United States, residing in Everett, in the county of Middlesex and State of Massachusetts, have invented an Improvement in Advertising Apparatus, of which the following description, in connection with the accompanying drawings, is a specification, like letters and numerals on the drawings representing like parts.

This invention relates to a display apparatus, and is herein shown as embodied in an apparatus especially applicable for advertising purposes.

In accordance with this invention a series or plurality of frames are arranged in sets which are bodily movable in opposite directions, and the said frames are individually transferred from one set to another and when transferred are allowed to rest for a suitable time to display the advertisements thereon, as will be described. The frames referred to may and preferably will be made so as to receive cards bearing the advertisement, which may readily be replaced when desired.

The apparatus is designed to contain a substantially large number of frames in a substantially small space, as will be described.

These and other features of this invention will be pointed out in the claims at the end of this specification.

Figure 1:
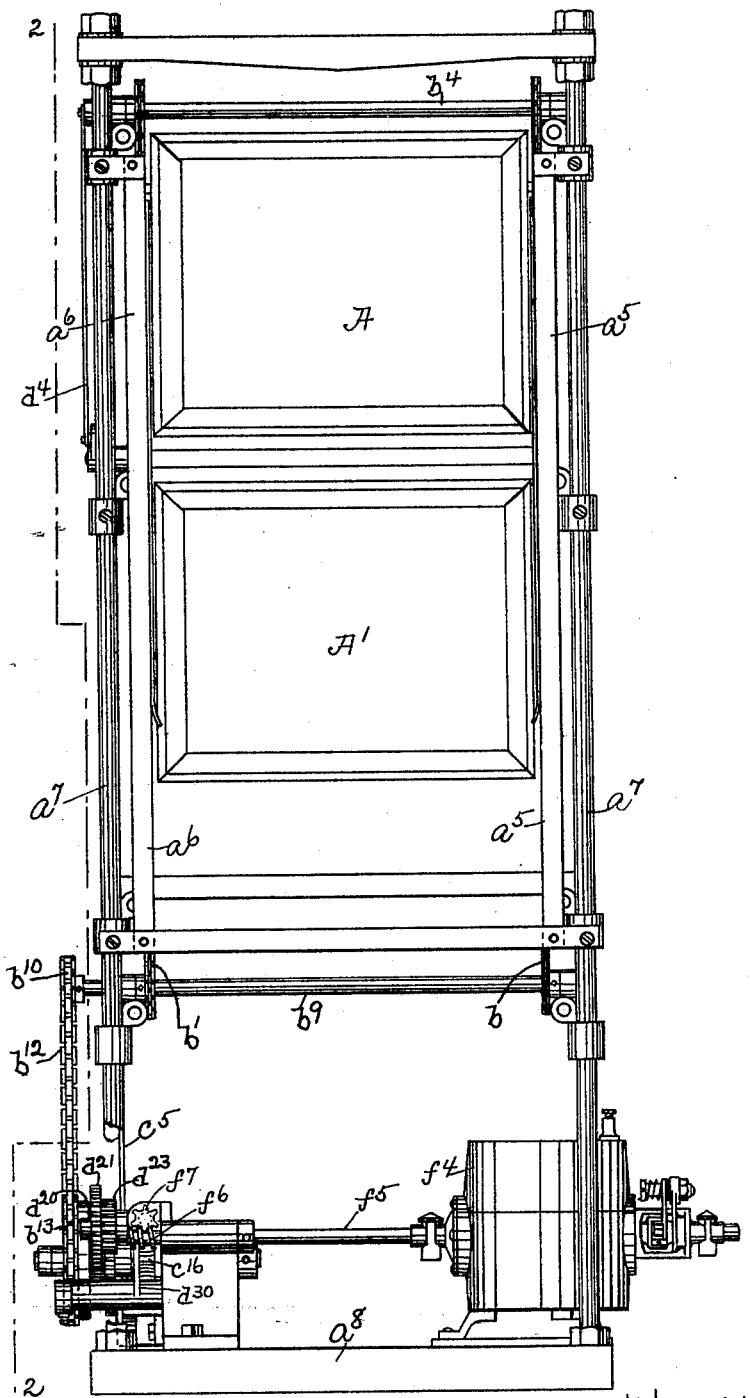
Figures 2, 3:
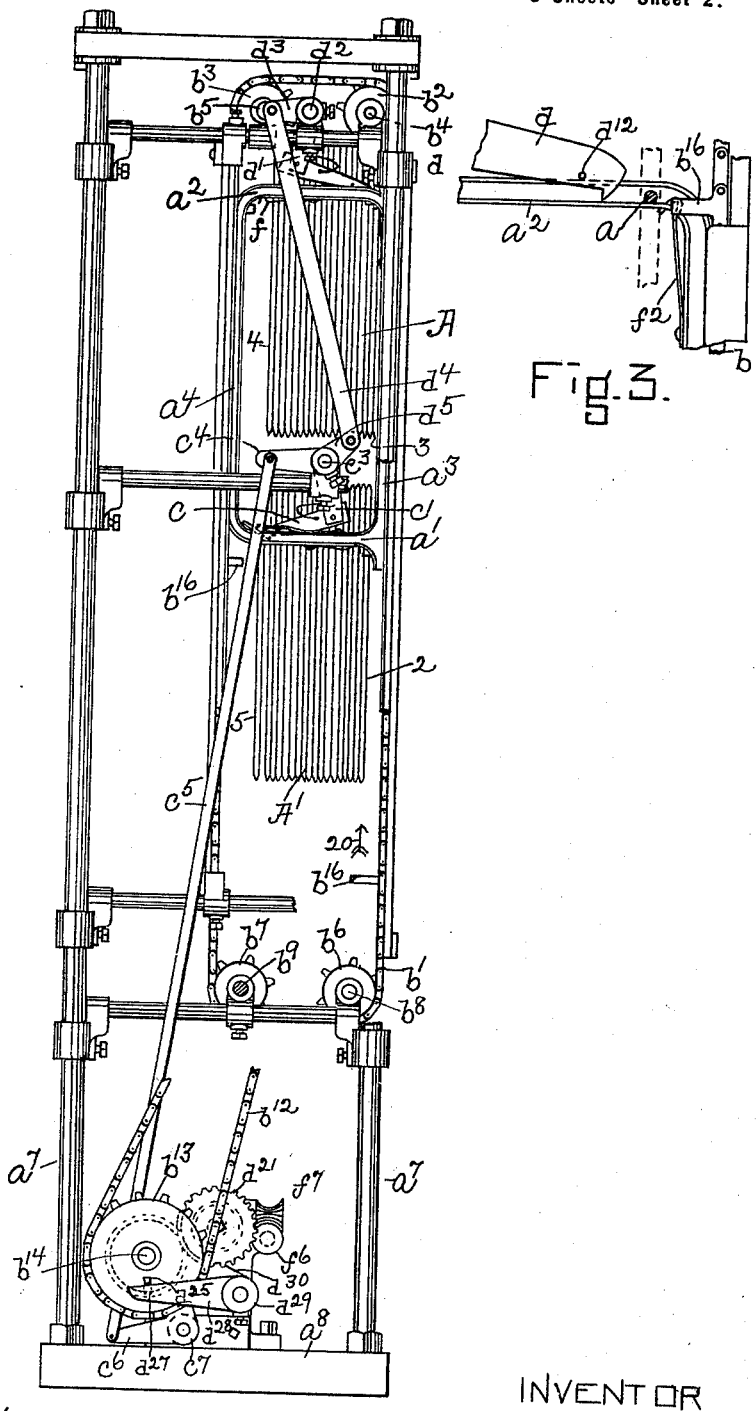
Figure 4:
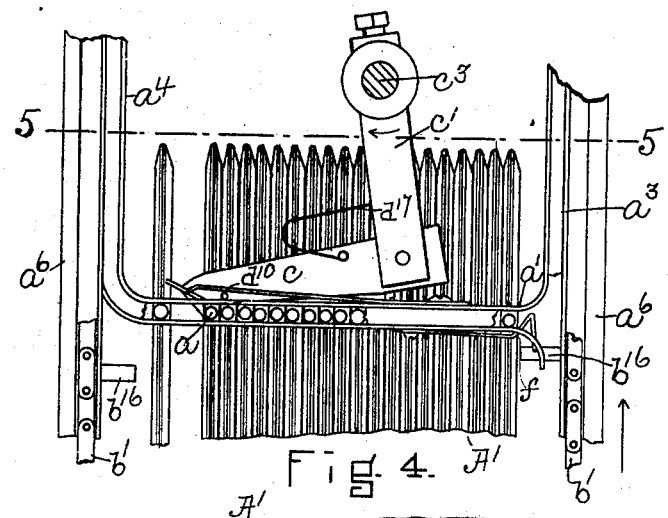
Figure 5:
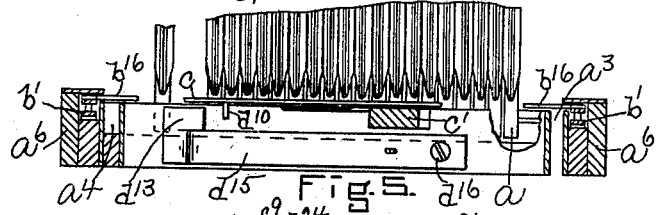
Figure 6:
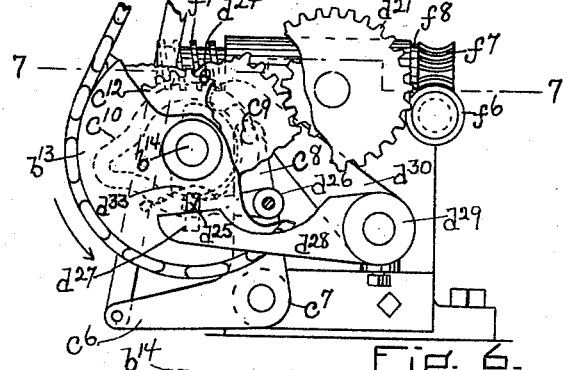

Figure 1 is a front elevation of an apparatus embodying this invention, the inclosing case for the operating parts being omitted; Fig. 2, a side elevation of the apparatus shown in Fig. 1, looking toward the right, parts of the framework being broken away; Fig. 3, an enlarged detail to be referred to; Fig. 4, a detail on an enlarged scale, showing the manner of transferring the frames from one side of the apparatus to the other; Fig. 5, a section on the line 5 5, Fig. 4; Fig. 6, a detail of the driving mechanism to be referred to, and Fig. 7 a plan view of the apparatus shown in Fig. 6.

Referring to the drawings, A represents an upper set or series of frames, and A' a lower set or series of like frames, which may be of metal or other material and preferably open to receive cards bearing the advertisement, preferably on both sides. The card-supporting frames of the sets A A' are movable in the present instance in a cycle or endless path and are provided on their opposite sides with suitable journals or projections $a$, (see Figs. 4 and 5,) which enter into the endless path and are supported by the lower walls of the horizontal sections $a'$ $a^2$ of said path, which sections are connected, as shown, to vertical sections $a^3$ $a^4$. The endless paths, composed of the sections $a'$ $a^2$ $a^3$ $a^4$, may be made of channel-bars and secured to the opposite sides $a^5$ $a^6$ of a supporting-frame secured to the side bars or rods $a^7$ of a main frame erected from a base $a^8$.

The card-receiving frames are adapted to be transferred from one set, as A', to the other, as A, and vice versa, by suitable carriers (shown as endless chains $b$ $b'$) located at opposite sides of the apparatus and passed about sprocket-wheels $b^2$ $b^3$, mounted on shafts $b^4$ $b^5$, supported at the top of the apparatus, and about sprocket-wheels $b^6$ $b^7$, mounted on shafts $b^8$ $b^9$, supported at the lower part of the apparatus, the shaft $b^9$ having a sprocket-wheel $b^{10}$, connected by a sprocket-chain $b^{12}$ with a sprocket-wheel $b^{13}$, loose on a shaft $b^{14}$, but adapted to be rendered periodically fast thereon, as will be described.

The endless carriers $b$ $b'$, as shown, are provided at suitable intervals with supporting devices for the card-receiving frames, and the said devices are shown as lugs or projecting bars $b^{16}$. The lugs $b^{16}$ act to support a frame of the lower set while said frame is being carried or transferred to the upper set, and vice versa, the said lugs projecting beyond the inner wall of the vertical sections of the raceway, (see Fig. 3,) so as to carry the journals of the frames into the horizontal sections $a'$ $a^2$ of said raceway.

The journals of the card-receiving frames when in horizontal sections of the raceway are adapted to be moved therein, so as to move the frames bodily and carry those received from one vertical section, as $a^3$, to the other vertical section $a^4$, and vice versa. The movement of the said frames in the lower section $a'$ may be effected by latches or hooked arms $c$, (see Fig. 4,) one at each side of the machine, which are pivoted to cranks $c'$ fast on a shaft $c^3$, having a crank $c^4$ joined by a link $c^5$ to one arm $c^6$ (see Fig. 6) of an elbow-lever $c^7$, having its other arm $c^8$ provided with a stud or roller $c^9$, (see dotted lines, Figs. 6 and 7,) which extends into a cam-groove $c^{10}$ in the face or side of a gear $c^{12}$, fast on the shaft $b^{14}$, the said gear having a hub $c^{14}$ fast to the said shaft and provided with a peripheral cam $c^{15}$ and worm-gear $c^{16}$. The movement of the card-frames in the upper horizontal section may be accomplished by similar latches or hooked arms $d$, pivoted to cranks $d'$ on a shaft $d^2$, having a crank $d^3$ joined by a link $d^4$ to a crank $d^5$ on the shaft $c^3$.

By reference to Fig. 2 it will be seen that the latches or hooked arms $c\ d$ operate on the card-frames in opposite directions. The latches or arms $c$ are provided with suitable pins $d^{10}$, which are adapted to ride upon inclined pieces or cams $d^{13}$, attached to the sections $a'$ of the raceway, they being shown as part of pieces $d^{15}$, secured by screws $d^{16}$ to the said sections. The cams $d^{13}$ act to turn the arms $c$ on their pivots against the springs $d^{17}$, and thereby lift the hooked end above the level of the journals of the frames, and the forward movement of said latches is sufficient to insure their hooked ends being beyond the said journals when the pins $d^{10}$ clear the cams $d^{13}$ and the arms drop down on the said journals. The movement of the card-receiving frames bodily across the apparatus is intermittent and is effected, as above described, by the cam-groove $c^{10}$ acting on the stud or roller $c^9$. The movement of the card-receiving frames from a lower to a higher set, and vice versa, is effected, as above described, by the endless chains, which are intermittently moved, thereby allowing the card-frames to be stationary when opposite suitable openings in an inclosing case for the apparatus, which case may be of wood or any suitable material and is not herein shown. The intermittent movement of the endless chains may be effected by mechanism as will now be described.

Figure 7:
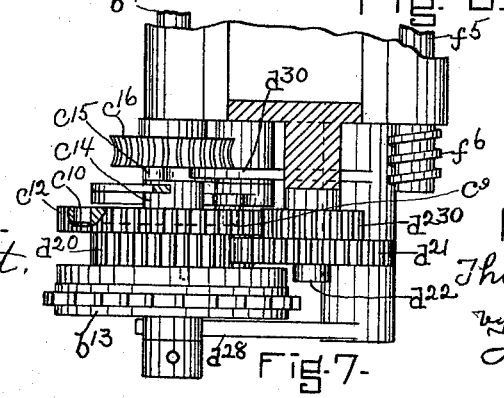

Referring to Figs. 6 and 7, the shaft $b^{14}$ has loose on it a gear-wheel $d^{20}$, which is driven by a gear $d^{21}$, loose on a stud or shaft $d^{22}$ and attached to a pinion or gear $d^{230}$, which meshes with and is driven by the gear $c^{12}$. The gear $d^{20}$ has projecting from one face a stud or pin $d^{24}$, which extends within the rim and toward the web or plate of the sprocket-wheel $b^{13}$ and forms one member of a clutch, the other member of which is a cross-bar $d^{25}$, carried by the end of a lever or arm $d^{26}$, pivoted to the inner face of the web or plate of the sprocket-wheel, the cross-bar $d^{25}$ extending through a slot $d^{27}$ in the said web or plate, to the outer side thereof, where it is adapted to coöperate with a crank or arm $d^{28}$ on a rock-shaft $d^{29}$, which has a second crank or arm $d^{30}$, engaging the periphery of the cam $c^{15}$, fast on the hub $c^{14}$. The sprocket-wheel $b^{13}$ is normally loose on the shaft $b^{14}$, but is adapted to be rendered fast to the gear $d^{20}$ by the engagement of the pin or stud $d^{24}$ with the cross-bar $d^{25}$, which is adapted to be lowered into the path of movement of said stud or pin, when so permitted, as will be described, by a spring $d^{33}$ acting on the arm or lever $d^{26}$, (see dotted lines, Fig. 6,) the said spring being attached at one end to the inner face of the web or plate of the sprocket-wheel.

The engagement of the stud or pin $d^{24}$ with the arm $d^{25}$ is governed by the peripheral cam $c^{15}$, which at the proper time permits the crank $d^{30}$ to move toward the hub $c^{14}$, and thereby rock the shaft $d^{29}$, so as to lower the end of the crank $d^{28}$ sufficiently to permit the cross-bar $d^{25}$ to be moved by its spring $d^{33}$ toward the periphery of the sprocket-wheel and into the path of movement of the stud $d^{24}$. When the stud $d^{24}$ engages the cross-bar $d^{25}$, the sprocket-wheel is clutched to the gear $d^{20}$ and rotates therewith, thereby driving the shaft $b^9$ and causing the endless chains to travel, so as to effect the transfer of a card-frame from one set, as A, to the other set, as A', and vice versa. The sprocket-wheel is carried one revolution by the gear $d^{20}$ and is then stopped by the crank $d^{28}$ moving the cross-bar $d^{25}$ toward the center of the wheel, which movement of the crank is effected by the cam $c^{15}$, and during the next revolution of the gear $d^{20}$ the sprocket-wheel remains at rest until the stud $d^{24}$ is brought substantially into position to engage the cross-bar, which is at such time permitted by the crank $d^{30}$ to be moved by the spring $d^{33}$ into line with the stud $d^{24}$.

The horizontal sections $a'\ a^2$ of the endless path for the card-frames are provided with springs $f$, which act as yielding abutments for the journals $a$, against which said journals are held by the latched arms $c\ d$ and which yield to permit the journals on the endmost card-frame to be forced out of the horizontal section into a vertical section when a card-frame is transferred from a vertical section into the horizontal section at its opposite end. The vertical sections $a^3$ are provided with springs $f^2$, the upper ends of which extend into the horizontal sections $a^2$ and are downwardly inclined, (see Fig. 3,) so as to assist the journals of the card-frames into the horizontal sections $a^2$.

The shaft $b^{14}$ may be driven in any suitable manner, and in the present instance is shown as driven by an electric motor $f^4$, having its armature-shaft $f^5$ provided with a worm $f^6$, which drives a worm-gear $f^7$ on a shaft $f^8$, having a worm $f^9$, which meshes with the worm-gear $c^{16}$.

The operation of the apparatus herein shown may be briefly described as follows: As shown in Fig. 2, the card-frames are at rest and the cards on the endmost frames (marked 2 3 4 5) may be supposed to be opposite suitable openings in the inclosing case. (Not herein shown.) The shaft $b^{14}$ may be supposed to be continuously in motion, and during each revolution the cam-groove $c^{10}$ operates on the lever $c^7$, and thereby causes the latches $c\ d$ to move forward, but in opposite directions, to engage the journals of the card-frames 3 5 and then to move backward and carry with them the card-frames 3 5 and at the same time move all the card-frames in the horizontal sections $a'$ $a^2$ of the raceway a sufficient distance to carry the said frames 2 4 into the vertical sections $a^3 a^4$ of the raceway and upon the lugs or projections $b^{16}$ on the endless chains, which at this time are set in motion in the direction indicated by arrow 20, thereby lifting the card-frame 2 from the lower set A' or from opposite the lower opening in the inclosing case up to the upper set A into line with the upper opening in said inclosing case and at the same time lowering the card-frame 4 from the upper set A to the lower set A' and opposite an opening in that side of the inclosing case. The card-frames exposed to view are allowed to remain opposite the openings in the inclosing case for a given length of time, which in the present instance is while the gear $d^{20}$ is making a revolution, and thereafter the said cards are transferred, as above described, to display a new card.

It will be seen from an inspection of Fig. 2 that the advertisement on one face or side of the card-frame 2 is exposed to view in two positions—namely, while it is the endmost card at the right of the sections $a'$ $a^2$, and the advertisement on the other side of said frame is exposed to view while the card-frame is the endmost one at the left of the said sections. During the passage or movement of the card-frame from one end of the raceway-sections $a'$ $a^2$ to the other the advertisement on the same is covered or removed from view. In this manner each card-frame may have attached to its opposite sides two placards bearing two different advertisements or the same advertisement, and in the former case each advertisement is given two exposures during the time the card-frame is traveling its complete cycle, and in the latter case the advertisement is given four exposures—two on opposite sides of the apparatus. The apparatus is capable of displaying a large number of different advertisements and yet be of substantially small compass, so as to take up substantially little room.

The latches $d$ are provided with pins $d^{12}$, which rest upon the sections $a^2$, and these latches do not require the use of cams to elevate them, as the lugs $b^{16}$ practically close the inlet end of the sections $a^2$ and form a solid abutment for the journals $a$ when the latches $d$ are moved forward to engage said journals. The latches $d$ on their forward movement ride over the journals $a$ and drop behind the same. The cams $d^{13}$ are used on the lower sections $a'$, as the inlet ends of these sections are not closed by the lugs $b^{16}$, which are carried below the same, and therefore the cams $d^{13}$ are employed to prevent the latches $c$ pushing the journals $a$ back into or toward the vertical sections, which would prevent engagement of the latches $c$ with said journals.

I claim—

1. An apparatus comprising a supporting-frame, endless raceways secured thereto and provided with substantially vertical and horizontal sections, a plurality of frames having journals extended into and supported by said horizontal sections to form upper and lower sets, endless carriers to transfer the frames from one set to the other and vice versa, means to move said frames in said horizontal sections and to place them into position to be transferred, a continuously-rotated shaft, and independent means actuated thereby to intermittently operate said endless carriers and the means for moving the frames in the horizontal sections, while said shaft is in motion, substantially as described.

2. An apparatus comprising a supporting-frame, endless raceways secured thereto and provided with substantially vertical and horizontal sections, a plurality of frames having journals extended into and supported by said horizontal sections to form upper and lower sets, endless carriers to transfer the frames from one set to the other and vice versa, means to operate said endless carriers intermittently comprising a shaft, a sprocket-wheel normally loose thereon, means to connect said sprocket-wheel with the endless carriers, a clutch to render said sprocket-wheel fast on said shaft, a cam to control the operation of said clutch, means to move said frames in said horizontal sections comprising levers to engage the journals of the frames, and a cam to intermittently operate said levers, substantially as described.

3. An apparatus comprising a supporting-frame, endless raceways secured thereto and provided with substantially vertical and horizontal sections, a plurality of frames having journals extended into and supported by said horizontal sections to form upper and lower sets, cam-actuated levers coöperating with the frames in said horizontal sections, a cam coöperating with the lever which engages the journals of the frames in the lower horizontal section, endless chains provided with lugs to support the journals of a frame and carry it from one horizontal section to the other, and means to intermittently operate said endless carriers, substantially as described.

4. An apparatus provided with a plurality of card-supporting frames arranged in sets, cam-actuated levers to effect bodily movement of all the frames in said sets in opposite directions, and endless carriers to transfer the frames individually from one set to the other, substantially as described.

In testimony whereof I have signed my name to this specification in the presence of two subscribing witnesses.

THORVALD HANSEN.

Witnesses:
JAS. H. CHURCHILL,
J. MURPHY.